3,002,580
INDEPENDENT WHEEL SUSPENSION FOR MOTOR VEHICLES
Josef Mueller, Stuttgart-Riedenberg, and Friedrich H. Van Winsen, Kirchheim, Teck, Germany, assignors to Daimler-Benz Aktiengesellschaft, Stuttgart-Unterturkheim, Germany
Filed Feb. 24, 1958, Ser. No. 717,158
Claims priority, application Germany Feb. 28, 1957
7 Claims. (Cl. 180—73)

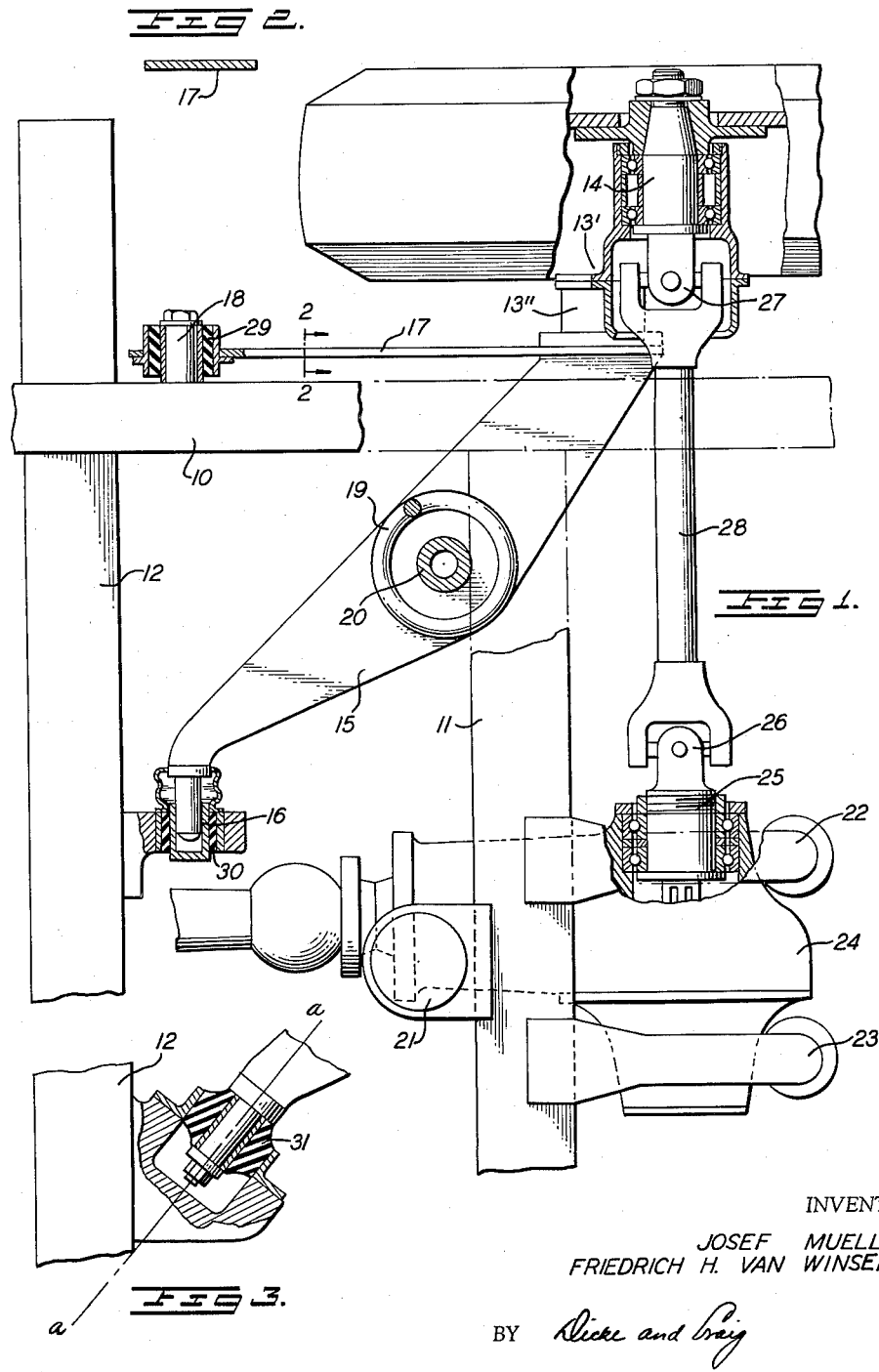
INVENTORS
JOSEF MUELLER
FRIEDRICH H. VAN WINSEN
BY Dicke and Craig
ATTORNEYS United States Patent Office 3,002,580
Patented Oct. 3, 1961

The present invention relates to an independent wheel suspension for vehicles, especially motor vehicles, and essentially consists in that the wheel carrier is guided, on the one hand, by means of a swinging half axle which is pivotally connected therewith and with the vehicle superstructure, such as the vehicle chassis, body or frame thereof, by a universal joint each, for example, by means of a ball and socket joint, a spherical joint, a Hooke's joint or the like and, on the other, by means of a crank axle rigidly connected therewith which enables movement or displacement of the wheel carrier in the vehicle transverse direction.

Such an arrangement offers the main advantage of a crank axle, namely a parallel displacement of the wheel plane through space during spring movement thereof without the accompanying disadvantage of the usual crank axle, namely the necessity to provide a sliding joint within the wheel drive.

The movability or displaceability of the wheel carrier in the transverse direction of the vehicle may be made possible in accordance with the present invention in that the crank axle is adapted to be displaced in the transverse direction of the vehicle in the support thereof in the vehicle superstructure. However, it is also possible to achieve the displaceability of the wheel carrier in that the crank axle is provided with a cross section or profile which renders the same decidedly flexible or pliable about vertical axes, i.e., to render the crank axle decidedly capable of yielding in connection with bending thereof about vertical axes.

In order to obtain a sufficiently large base for the support of the crank axle, the present invention proposes to construct the crank axle as a triangular guide member, one arm of which extends from the wheel carrier in the vehicle longitudinal direction and the other arm of which extends from the wheel carrier diagonally inwardly. The arrangement in accordance with the present invention may thereby be so made that only the diagonal arm is supported with freedom of movement in the transverse direction of the vehicle at the vehicle superstructure whereas the longitudinal arm is constructed so as to be very flexible, i.e., offer very little resistance to bending about a vertical axis or axes. The spring carrying the vehicle weight thereby advantageously abuts against the rigid diagonal arm.

The support of the diagonal arm at the vehicle body may consist of a pin-type bearing extending in the transverse direction of the vehicle which enables displacement or movement in the direction of the axis of the pin. However, it is also possible to pivotally connect the diagonal arm in a rubber joint at the vehicle body whereby the rubber joint consists preferably of a pin extending in the direction of the diagonal arm and of a rubber sleeve surrounding the same.

A particularly simple and weight-saving construction is obtained in accordance with the present invention if a special pivotally connected swinging half axle is dispensed with which, for example, is normally pivotally connected by means of ball joints, and if the function of the swinging half axle guiding the wheel carrier is transferred to the drive shafts which are already in existence with those types of half axles supporting driven wheels, for example, to the drive shafts pivotally supported by means of universal joints.

It may also be desirable under certain circumstances if the wheel suspension possesses, to a slight degree, certain properties of the usual swinging half axle suspension. This may be readily made possible if the geometric axis of the crank axle bearing at the vehicle body extends, as seen in plan view, from the inside toward the outside of the vehicle approximately in the direction toward the swinging half axle. The geometric axis may also be inclined to the plane of the road bed if this is desired, for example, for purposes of achieving a particular position of the moment center for the relative movement between the wheel and the vehicle superstructure or body.

Accordingly, it is an object of the present invention to provide an independent wheel suspension for vehicle wheels which entails the advantages of the crank axle without the disadvantage of the necessity of providing a sliding joint in the drive shaft for the driven wheel thereof.

Another object of the present invention is the provision of an independent wheel suspension for wheels of motor vehicles, particularly driven wheels, in which the wheel carrier is capable of performing certain movements notwithstanding a relatively rigid axle support therefor.

Still another object of the present invention is the provision of an independent wheel suspension for the driven wheels of a motor vehicle in which the wheel carrier is able to perform spring movements about the center of one of the universal joints connecting the drive shaft with the wheel carrier and the axle gear by providing the necessary freedom of movement for the guide element of the wheel carrier which enable such movements.

These and other objects, features and advantages of the present invention will become more obvious from the following description when taken in connetcion with the accompanying drawing which shows, for purposes of illustration, two embodiments in accordance with the present invention, and wherein:

FIGURE 1 is a plan view of a wheel suspension of the right driven rear wheel of a motor vehicle in accordance with the present invention, with certain parts thereof broken away to show more clearly the details thereof;

FIGURE 2 is a cross-sectional view taken along line 2—2 of FIGURE 1 and showing the cross section of the part of the crank axle extending in the longitudinal direction of the vehicle; and FIGURE 3 is a partial cross-sectional view through a modified bearing support of the diagonal section of the crank axle at the vehicle superstructure.

The term "superstructure" is used herein to designate the relatively stationary part of the vehicle, such as the frame, chassis or self-supporting body at which the wheel suspension is normally mounted.

Referring now to the drawing, wherein like reference numerals are used throughout the various views to designate like parts, and more particularly to FIGURES 1 and 2 thereof, reference numeral 10 designates the right longitudinal bearer member of the frame of the motor vehicle while reference numeral 11 designates a first cross bearer member of the frame extending in proximity to the rear axle and reference numeral 12 a second cross bearer member disposed in front of the cross bearer member 11. The longitudinal bearer member 10 is offset upwardly within the region of the axle so that the cross bearer member 11 is disposed above the cross bearer member 12. The wheel carrier consists of two parts 13' and 13" provided with flanges along which they are connected in any suitable manner, for example, by welding.

The wheel shaft 14 is supported in the part 13' in a manner so as to be immovable in the axial direction, as shown in FIGURE 1 in which the wheel shaft 14 is tightly secured by means of the tapered portion thereof in a tapered support member rigidly secured to the wheel, the two tapered parts being tightened against each other by means of a nut member or the like.

A diagonally extending rigid arm 15 of the crank axle is rigidly connected with the part 13" of the wheel carrier in any suitable manner. The diagonally extending arm 15 is supported in a pin-type bearing 16 at the cross bearer member 12 in such a manner as to be displaceable or movable in the transverse direction of the vehicle. A part or guide arm 17 of the crank axle which extends in the longitudinal direction of the vehicle is also rigidly connected with the part 13" of the wheel carrier which part 17 has a cross-section or profile, as clearly shown in FIG. 2, so as to be relatively very rigid or resistant to bending about a horizontal cross axis whereas it is very decidedly flexible or yielding with respect to any bending about vertical axes. The part or guide arm 17 is pivotally supported by means of a pin 18 at the longitudinal bearer member 10.

The coil spring 19 which transmits the weight of the vehicle to the wheel suspension and the shock absorber 20 arranged therein are supported on the one hand, against the cross bearer member 11, and, on the other, at the diagonal arm 15.

The differential axle gear housing 24 is supported at the cross bearer member 11 by means of three lugs or support members 21, 22 and 23. The stub drive shaft 25 is axially fixed. The stub shaft 25 is connected with the wheel drive shaft 14 by means of a universal joint consisting of two perpendicularly arranged joints 26 and 27.

*Operation*

During spring movements of the wheel, the wheel carrier 13' and 13" is guided in the longitudinal direction of the vehicle by the crankaxle arm 17 and thereby moves along an arc about the pin 18. The wheel carrier 13' and 13" is guided in the transverse direction of the vehicle by the drive shaft 28 along an arc about the universal joint 26. The necessary displacement of the wheel carrier 13', 13" in the transverse direction of the vehicle necessitated by such arcuate movement is rendered possible, on the one hand, by the displaceable pin-type bearing support 16 and, on the other, by the ready flexibility of the arm 17. The arm 17 then assumes an S-shaped configuration, as seen in plan view.

Rubber elements 29 and 30 are arranged in the bearing 18 as well as in the bearing 16 whereby the element 29 takes over the place of the usual sleeve bearing which ordinarily has to be lubricated, and the element 30 as well as also the element 29 take also over the function of a noise and vibration damper. Of course, both rubber elements 29 and 30 also help to equalize any slight undesired misalignments caused by accidents or inaccuracies in the manufacture thereof.

In the embodiment according to FIGURE 3, the pin-type bearing 16 is replaced by a bearing having a rubber element 31 which also enables, in addition to the aforementioned functions of rubber elements 29 and 30, the displaceability in the transverse direction of the crank axle during spring movements of the wheel. The geometric axis $a—a$ of the bearing as seen in FIGURE 3 extends diagonally of the vehicle from the inside of the vehicle to the outside thereof approximately in the direction toward the half-axle.

While we have shown and described two embodiments in accordance with the present invention, it is understood that the same is not limited thereto but is susceptible of many changes and modifications within the spirit of the present invention and we, therefore, intend to cover all such changes and modifications as encompassed by the appended claims.

We claim:

1. An individual wheel suspension for a motor vehicle having a vehicle superstructure comprising a wheel carrier, swinging half axle means having inner and outer joint means at an essentially constant radial distance from each other and from the vehicle longitudinal center plane, means for positively guiding said wheel carrier in the vehicle transverse direction including said half-axle means and means connecting said outer joint means and said wheel carrier to essentially prevent movement therebetween in the vehicle transverse direction, and crank axle means connected with said wheel carrier and said superstructure guiding said wheel carrier during spring movements in the upward and downward direction thereof in exclusively essentially parallel planes to thereby assure that the wheel plane of the wheel adapted to be supported on said wheel carrier forms essentially the same angle with respect to the surface of the road during spring movements thereof.

2. A wheel suspension according to claim 1 wherein at least part of said crank axle means is flexible about vertical axes.

3. A wheel suspension according to claim 1, wherein said swinging half axle means simultaneously constitutes the wheel drive shaft.

4. A wheel suspension according to claim 1, wherein said crank axle means includes a longitudinally extending arm and a diagonally inwardly extending arm, and further comprising bearing means pivotally connecting the inward end of said inwardly extending arm at said superstructure and including a pin and a rubber sleeve surrounding said pin to enable movement of said inwardly extending arm in the direction of said pin.

5. An individual wheel suspension for a motor vehicle as defined in claim 1, wherein said crank axle means includes a flexible longitudinally-extending arm and a diagonally inwardly-extending arm, and further comprising bearing means including an elastic sleeve pivotally connecting the inward end of said inwardly-extending arm at said superstructure, the geometric axis of said bearing means extending diagonally of the vehicle from the inside toward the outside of the vehicle in the direction toward said half-axle means as seen in plan view.

6. An individual wheel suspension for a motor vehicle having a superstructure comprising a wheel carrier, means including swinging half-axle means having joint means enabling universal movement thereof for positively guiding said wheel carrier in the vehicle transverse direction by said half-axle means, and crank axle means having a pivot axis extending essentially in the vehicle transverse direction, said crank axle means being rigidly connected with said wheel carrier for guiding said wheel carrier in the vehicle longitudinal direction while enabling movements of said wheel carrier in said vehicle transverse direction during up-and-down movements of said half-axle means and including a V-shaped guide member having two arms connected to said wheel carrier and said superstructure, one of said arms extending from said wheel carrier in the longitudinal direction of the vehicle and the other of said arms extending diagonally inwardly from said wheel carrier, said one arm being flexible about vertical axes and said other arm having limited freedom of movement in the transverse direction of the vehicle at the superstructure.

7. An individual wheel suspension for a motor vehicle having a vehicle superstructure comprising a wheel carrier, swinging half axle means having inner and outer joint means at an essentially constant radial distance from each other and from the vehicle longitudinal center plane, means for positively guiding said wheel carrier in the vehicle transverse direction including said half-axle means and means connecting said outer joint means and said wheel carrier to essentially prevent movement there-between in the vehicle transverse direction, and crank axle means pivotally secured to said superstructure and rigidly connected with said wheel carrier for guiding said wheel carrier in the vehicle longitudinal direction, said crank axle means having a pivot axis extending essentially in the vehicle transverse direction and being so constructed and arranged as to guide said wheel carrier during spring movements thereof in exclusively essentially parallel planes to assure that the wheel plane of the wheel adapted to be supported on said wheel carrier forms essentially the same angle with respect to the surface of the road during spring movements thereof and including one arm extending from said wheel carrier in the longitudinal direction of the vehicle and another arm extending diagonally inwardly from said wheel carrier, said another diagonal arm having limited freedom of movement in the transverse direction of the vehicle at said superstructure and said one longitudinal arm being flexible about vertical axes.

References Cited in the file of this patent
UNITED STATES PATENTS

| | | |
|---|---|---|
| 1,761,135 | Moon | June 3, 1930 |
| 2,129,232 | Paton | Sept. 6, 1938 |
| 2,741,493 | Matthias | Apr. 10, 1956 |

FOREIGN PATENTS

| | | |
|---|---|---|
| 920,109 | Germany | Nov. 11, 1954 |